UNITED STATES PATENT OFFICE.

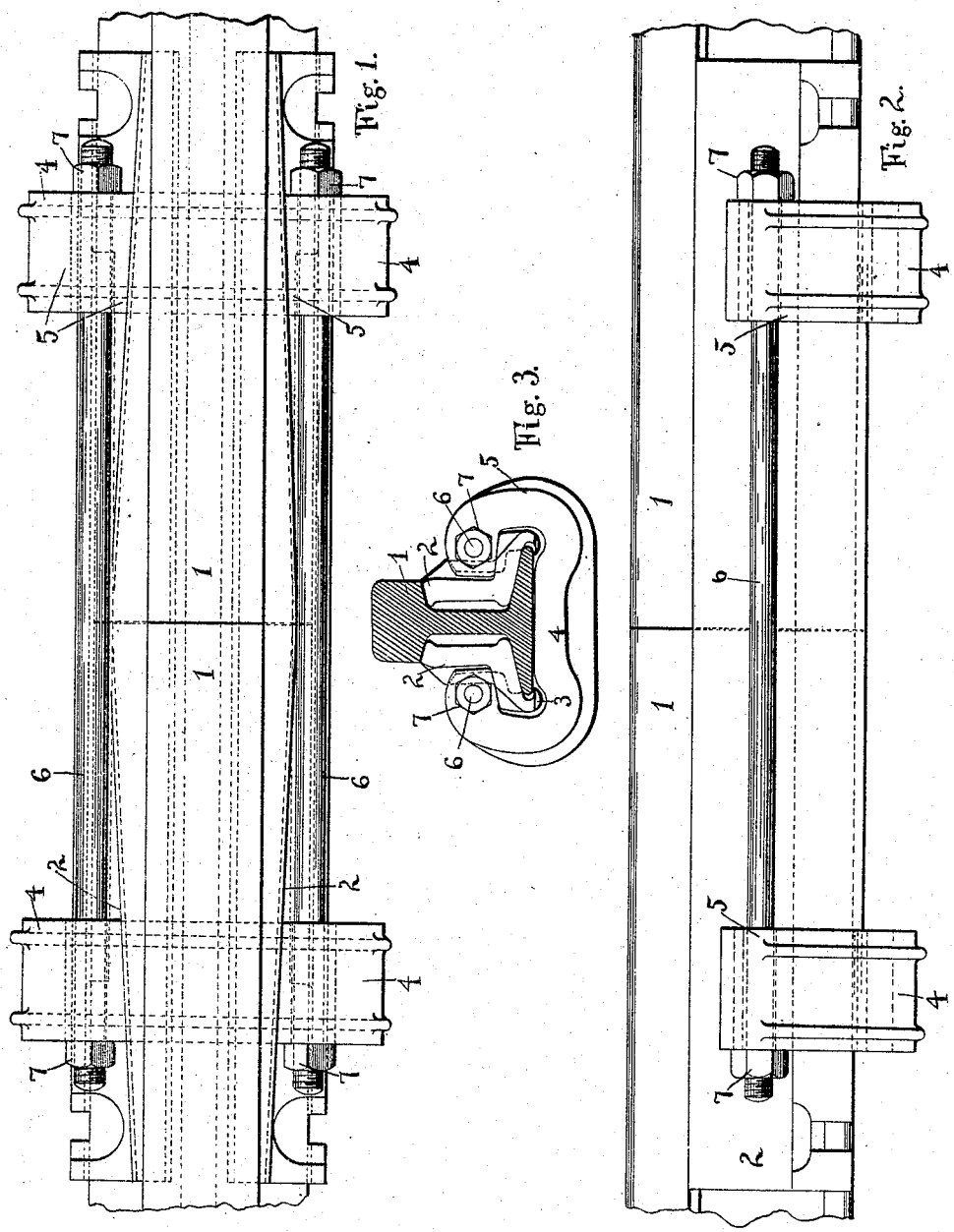

CHRISTIAN HUSS, OF PITCAIRN, PENNSYLVANIA, ASSIGNOR OF ONE-HALF TO JOHN F. COURSON, OF PITCAIRN, PENNSYLVANIA.

RAIL-JOINT.

No. 907,805.  Specification of Letters Patent.  Patented Dec. 29, 1908.

Application filed December 9, 1907. Serial No. 405,773.

*To all whom it may concern:*

Be it known that I, CHRISTIAN HUSS, citizen of the United States, residing at Pitcairn, Pennsylvania, have invented certain new and useful Improvements in Rail-Joints, of which the following is a specification.

My invention relates to rail joints and it comprises a combination of fish plates and clamps by which the said fish plates may be securely pressed against the adjacent ends of the rails for holding them in place, the structure dispensing with the use of bolts passing through the webs of the rails and through the fish plates, said structure also being capable of application either at the rail joint or where a rail may be broken.

The invention consists of the features, combination and arrangement of parts hereinafter described and particularly pointed out in the appended claim.

In the accompanying drawings,—Figure 1 is a plan view of a rail joint embodying my invention. Fig. 2 is a side view. Fig. 3 is a cross sectional view through a rail with my invention in end elevation.

In these drawings, the adjacent ends of the rails are indicated at 1, these rails being of substantially ordinary form, being of standard dimensions and shape for railways. 2 indicates the fish plates, one of which is placed on each side of the rail, these fish plates being adapted to fit under the head of the rail and also fit against the base flange of the rail and having flanges 3 on their lower edges to grasp the edge of the rail flange and having notches at their extremities for spikes which will prevent any longitudinal movement. These fish plates are tapered from their middle portion towards each end, as shown in Fig. 1. I employ in connection with these tapered fish plates, clamps 4 independent of the ties, each of which has a main portion extending under the rail with upturned ends 5, which at their upper ends reach inwardly and bear upon the inclined surfaces of the fish plates, these inwardly projecting ends presenting inclined surfaces, as shown in Fig. 1 corresponding to the inclines of the fish plates. There is one of these clamps at each end of the fish plates and they are connected together by tie rods 6 extending longitudinally of the rail joint on each side of the rail and through the clamps. These tie rods are threaded at their ends and receive nuts 7 by which the clamps may be drawn towards each other, to securely clamp the fish plates in place and force them hard against the lateral faces of the rails.

It will be observed that the fish plates are held to the rails without the use of transverse bolts, as in ordinary practice, which necessitates the perforation or cutting away of the rail itself.

The fish plates and clamps may be applied to a broken rail without removing the rail from the road bed in cases where it is necessary, as it will be observed as above stated, that no transverse bolt is necessary, and with my invention expansion and contraction of the rails can take place without in any way interfering with the function of the fish plates and the secure holding of the rail ends.

I claim as my invention:

In combination in a rail joint, the fish plates having approximately horizontal base plates with vertical extensions tapered towards their ends and one being employed on each side of the rail, the base plates having suitable notches at their extremities to receive spikes, a pair of clamps each adapted to pass from side to side beneath the rail and between and independent of the ties and having up-turned ends to bear on the inclines of the fish plates and the tie bolts extending from one clamp to the other, whereby the fish plates are secured to the ties and the clamps to each other, substantially as described.

In testimony whereof I affix my signature in presence of two witnesses.

CHRISTIAN HUSS.

Witnesses:
 JOHN F. COURSON,
 JAMES SMITH.